(12) United States Patent
Polozoff (10) Patent No.: US 7,703,144 B2
(45) Date of Patent: Apr. 20, 2010

(54) METHOD, APPARATUS, AND PROGRAM TO POST PROCESS APPLICATIONS ENCRYPTING SENSITIVE OBJECTS THAT ARE LOGGED

(75) Inventor: Alexandre Polozoff, Bloomington, IL (US)

(73) Assignee: International Business Machines Corporation, Armonk, NY (US)

( * ) Notice: Subject to any disclaimer, the term of this patent is extended or adjusted under 35 U.S.C. 154(b) by 1408 days.

(21) Appl. No.: 11/104,047

(22) Filed: Apr. 12, 2005

(65) Prior Publication Data

US 2006/0230292 A1    Oct. 12, 2006

(51) Int. Cl.
G06F 7/04      (2006.01)
G06F 17/30     (2006.01)
H04N 7/16      (2006.01)

(52) U.S. Cl. .................................. 726/26; 713/160
(58) Field of Classification Search ............. 713/160; 726/26
See application file for complete search history.

(56) References Cited

U.S. PATENT DOCUMENTS

| | | | | |
|---|---|---|---|---|
| 5,481,601 A | | 1/1996 | Nazif et al. ............... 379/207 |
| 5,682,328 A | | 10/1997 | Roeber et al. ............. 364/550 |
| 5,895,472 A | * | 4/1999 | Brodsky et al. ........... 707/203 |
| 5,978,475 A | * | 11/1999 | Schneier et al. .......... 713/177 |
| 6,286,098 B1 | | 9/2001 | Wenig et al. ............. 713/151 |
| 6,385,596 B1 | | 5/2002 | Wiser et al. ................ 705/51 |
| 6,470,388 B1 | * | 10/2002 | Niemi et al. ............. 709/224 |
| 6,530,024 B1 | | 3/2003 | Proctor .................... 713/201 |
| 6,725,240 B1 | | 4/2004 | Asad et al. ............... 707/202 |
| 6,978,303 B1 | * | 12/2005 | McCreesh et al. ........ 709/224 |
| 2004/0054899 A1 | | 3/2004 | Balfanz et al. ........... 713/168 |
| 2004/0093504 A1 | | 5/2004 | Ishizaki .................... 713/189 |
| 2004/0220945 A1 | | 11/2004 | Pioli et al. ................ 707/100 |
| 2005/0204344 A1 | * | 9/2005 | Shinomi ................... 717/124 |
| 2007/0168913 A1 | * | 7/2007 | Sarukkai et al. ........ 717/101 |
| 2007/0288768 A1 | * | 12/2007 | Nesta et al. .............. 713/194 |

OTHER PUBLICATIONS

Lafferty et al., Language-Independent Aspect-Oriented Programming, Oct. 2003, ACM.*
Jay Gattani, An Analysis of Aspect Oriented Programming with AspectJ, Aug. 2003, University of Houston.*

* cited by examiner

*Primary Examiner*—David Garcia Cervetti
(74) *Attorney, Agent, or Firm*—Yee & Associates, P.C.; Matthew W. Baca (57) ABSTRACT

A mechanism is provided to declaratively identify objects that are sensitive and requiring encryption on logging. A user interface allows an administrator to identify the objects that are deemed to be sensitive log objects and the logging class that provides the logging functionality. The user interface may also allow the administrator to identify the public key to be used for encryption. The mechanism of the present invention dynamically generates logic for encryption of sensitive objects to be logged with declarative identification of sensitive objects.

15 Claims, 5 Drawing Sheets

METHOD, APPARATUS, AND PROGRAM TO POST PROCESS APPLICATIONS ENCRYPTING SENSITIVE OBJECTS THAT ARE LOGGED

BACKGROUND OF THE INVENTION

1. Technical Field

The present invention relates to data processing and, in particular, to application and data logging. Still more particularly, the present invention provides a method, apparatus, and program to post process applications encrypting sensitive objects that are logged.

2. Description of Related Art

Many applications log data. An application typically has three types of logs: audit, error, and trace. Of these three log types, sensitive data is usually associated with some log entries. Therefore, encryption may be used to protect the sensitive data.

An application typically logs objects by calling a log application and passing the objects as parameters to the log application. Either the application must encrypt sensitive objects before passing them to the log application or, alternatively, the log application must identify the sensitive objects and perform the encryption.

The current solution to this problem is to programmatically encrypt the objects that are deemed to be sensitive. This solution requires a developer to code the encryption, as well as logic to determine which objects to encrypt, directly into the application. When changes that affect which objects are deemed sensitive occur, the application code must also change. This solution does not have a high degree of flexibility because the logic identifying sensitive objects is written into the application code.

SUMMARY OF THE INVENTION

The present invention recognizes the disadvantages of the prior art and provides a mechanism to declaratively identify objects, or attributes of those objects, that are sensitive and require encryption on logging. A user interface allows an administrator to identify the objects that are deemed to be sensitive objects and the logging class that provides the logging functionality. The user interface may also allow the administrator to identify the public key to be used for encryption. The mechanism of the present invention dynamically generates logic for encryption of sensitive objects to be logged with declarative identification of sensitive objects.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
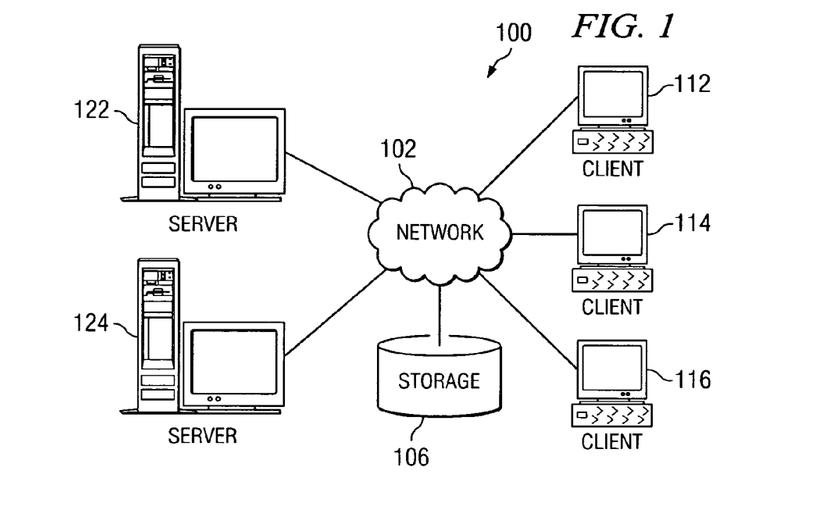
FIG. 1 depicts a pictorial representation of a network of data processing systems in which the present invention may be implemented.
Figure 2:
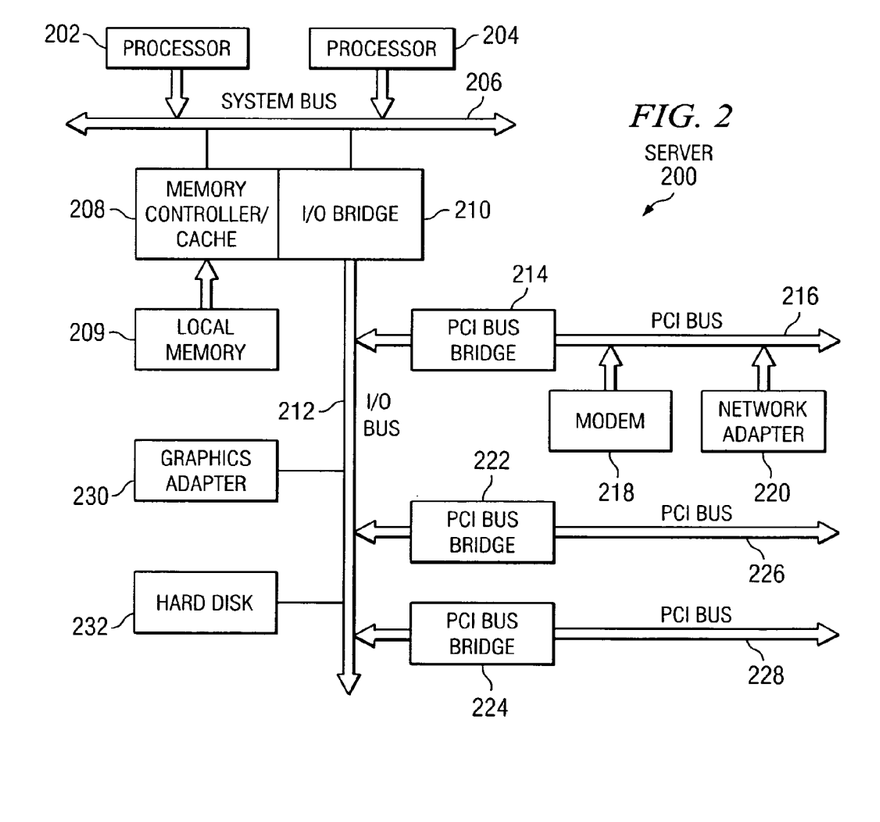
FIG. 2 is a block diagram of a data processing system that may be implemented as a server in accordance with an exemplary embodiment of the present invention.
Figure 3:
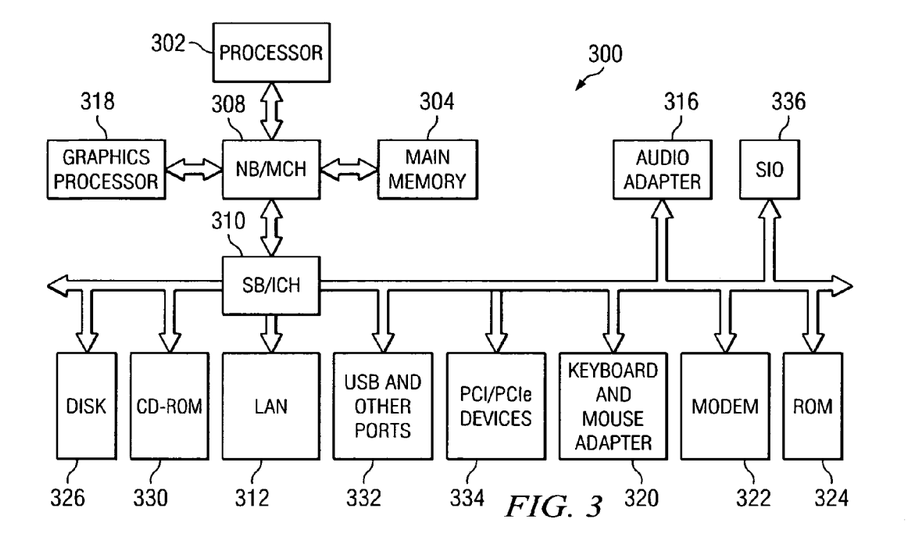
FIG. 3 is a block diagram of a data processing system in which the present invention may be implemented.

The present invention provides a method, apparatus, and computer program product, in a data processing device, for declarative identification of sensitive objects requiring encryption on logging. The data processing device may be a single-processor computing device, a multiprocessing data processing system, or a virtual processor environment in which multiple processors and multiple layers of software may be utilized to perform various aspects of the present invention. Therefore, the following FIGS. 1-3 are provided as representative diagrams of data processing environments in which the present invention may be implemented. It should be appreciated that FIGS. 1-3 are only exemplary and are not intended to assert or imply any limitation with regard to the environments in which the present invention may be implemented. Many modifications to the depicted environments may be made without departing from the spirit and scope of the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102 that is the medium used to provide communications links between various devices and computers connected together within network data processing system 100. Network 102 may include connections, such as wire, wireless communication links, or fiber optic cables.

In the depicted example, servers 122, 124 are connected to network 102 along with storage unit 106. In addition, clients 112, 114, and 116 are connected to network 102. These clients 112, 114, and 116 may be, for example, personal computers or network computers. In the depicted example, servers 122, 124 may provide services to clients 112-116. Clients 112, 114, and 116 are clients to servers 122, 124. Network data processing system 100 may include additional servers, clients, and other devices not shown.

More particularly, server 122, 124 may be part of a server cluster, which is a group of related servers providing services to clients. Each server may include the same applications and a request router, sometimes referred to as a "sprayer," issues the requests to the servers in the cluster, often performing load-balancing.

Applications running servers 122, 124 may log data. Data may be logged in storage 106, for example. A user interface may be used on an administrator workstation, such as one of clients 112-116, to identify objects that are deemed to be sensitive log objects and the logging class that provides the logging functionality. Through these two declarations, logic is provided that makes an encrypted copy of sensitive objects that are then passed into the identified log class.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with an exemplary embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer™ pSeries® system, a product of International Business Machines Corporation in Armonk, N.Y., running the Advanced Interactive Executive (AIX™) operating system or Linux™ operating system. "LINUX" is a trademark of Linus Torvalds.

With reference now to FIG. 3, a block diagram of a data processing system is shown in which the present invention may be implemented. Data processing system 300 is an example of a computer, such as client 108 in FIG. 1, in which code or instructions implementing the processes of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM driver 330, universal serial bus (USB) ports and other communications ports 332, and PCI/PCIe devices 334 may be connected to ICH 310. PCI/PCIe devices may include, for example, Ethernet adapters, add-in cards, PC cards for notebook computers, etc. PCI uses a cardbus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and is used to coordinate and provide control of various components within data processing system 300 in FIG. 3. The operating system may be a commercially available operating system such as Windows XP™, which is available from Microsoft Corporation. An object oriented programming system, such as the Java™ programming system, may run in conjunction with the operating system and provides calls to the operating system from Java™ programs or applications executing on data processing system 300. "JAVA" is a trademark of Sun Microsystems, Inc.

Instructions for the operating system, the object-oriented programming system, and applications or programs are located on storage devices, such as hard disk drive 326, and may be loaded into main memory 304 for execution by processor 302. The processes of the present invention are performed by processor 302 using computer implemented instructions, which may be located in a memory such as, for example, main memory 304, memory 324, or in one or more peripheral devices 326 and 330.

Those of ordinary skill in the art will appreciate that the hardware in FIG. 3 may vary depending on the implementation. Other internal hardware or peripheral devices, such as flash memory, equivalent non-volatile memory, or optical disk drives and the like, may be used in addition to or in place of the hardware depicted in FIG. 3. Also, the processes of the present invention may be applied to a multiprocessor data processing system.

For example, data processing system 300 may be a personal digital assistant (PDA), which is configured with flash memory to provide non-volatile memory for storing operating system files and/or user-generated data. The depicted example in FIG. 3 and above-described examples are not meant to imply architectural limitations. For example, data processing system 300 also may be a tablet computer, laptop computer, or telephone device in addition to taking the form of a PDA.

Figure 4A:
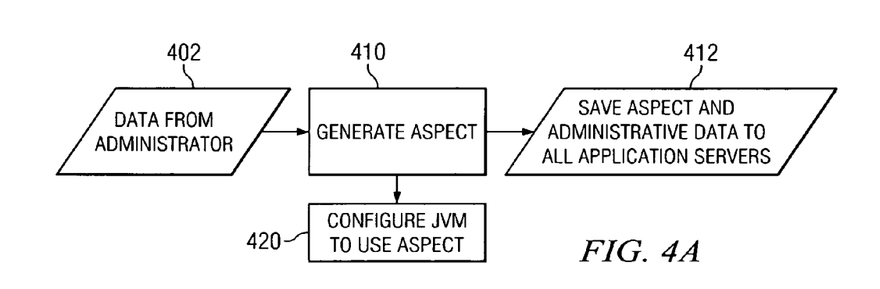
FIGS. 4A and 4B depict a mechanism for logging sensitive objects such that the objects are declaratively identified is shown in accordance with an exemplary embodiment of the present invention.
Figure 4B:
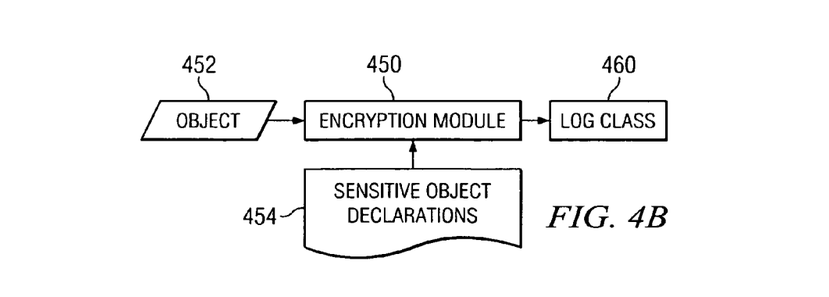

FIGS. 4A and 4B depict a mechanism for logging sensitive objects such that the objects are declaratively identified is shown in accordance with an exemplary embodiment of the present invention. More particularly, with reference to FIG. 4A, module 410 may provide a user interface for an administrator, for example, to identify objects that are deemed to be sensitive objects and the logging class that provides the logging functionality. Data 402 is received from a user interface or provided in a declaration file, such as an extensible markup language (XML) file or other text or markup language file.

Module 410 generates an aspect that is enabled to make an encrypted copy of sensitive objects that may then be passed on to the identified log class. Module 410 saves the aspect and administrative data 412 to all application servers, and module 420 configures the runtime environment of the application to use the aspect with the identified logging class. The runtime environment may be, for example, a Java™ virtual machine (JVM). In addition, Microsoft's .Net™ framework accepts aspects.

An aspect is a part of a program that cross-cuts its core concerns, thus violating its separation of concerns. In other words, an aspect is needed to complete the program, but is not necessarily specific to the domain for which the program is written. Using aspect-oriented programming (AOP), one can isolate such aspects as logging and persistence from business logic.

Another view is that every major feature of a program, core concern (business logic), or cross-cutting concern (additional features) is an aspect. By weaving aspects together, one can produce a whole out of the separate aspects. A problem may be split into its many aspects like a prism separates light into its many colors, and the many aspects may then be woven back into a solution for the whole problem just as a second prism may combine the different colors back into a ray of white light.

The paradigm of aspect-oriented programming was first introduced in Gregor Kiczales et al., Aspect-Oriented Programming in Proceedings of the European Conference on Object-Oriented Programming (ECOOP 97), June 1997, which is hereby incorporated by reference. Aspect-oriented programming is also described in U.S. Pat. No 6,467,086 to Kiczales, et al., entitled "ASPECT ORIENTED PROGRAMMING," and U.S. Pat. No. 6,539,390 to Kiczales, et al., entitled "INTEGRATED DEVELOPMENT ENVIRONMENT FOR ASPECT-ORIENTED PROGRAMMING," which are herein incorporated by reference.

The new aspect is propagated to the application server group. Then, the aspect is applied to the runtime environment of the application. When the administrator restarts the application, the runtime environment, such as a JVM classloader, dynamically starts to use the aspect in association with the identified logging class when an object is logged. The aspect then uses the administrative data that declaratively identifies sensitive objects to perform encryption of the sensitive data.

Turning to FIG. 4B, when object 452 is passed to log class 460, encryption module 450 uses sensitive object declarations 454 to determine whether object 452 is identified as a sensitive object. If object 452 is identified as a sensitive object, then encryption module 450 makes an encrypted copy of the sensitive object before passing object 452 to log class 460.

Encryption module 450 may be an aspect, as described above with reference to FIG. 4A. In the depicted example, log class 460 may itself be an aspect and aspect 450 may be referred to as a "before aspect." While the examples are illustrated using aspect-oriented programming, other techniques may be used to add encryption with declaratively identified objects. For example, bytecode insertion may be used to add encryption with declarative identification of sensitive objects to the logging class.

Figure 5A:
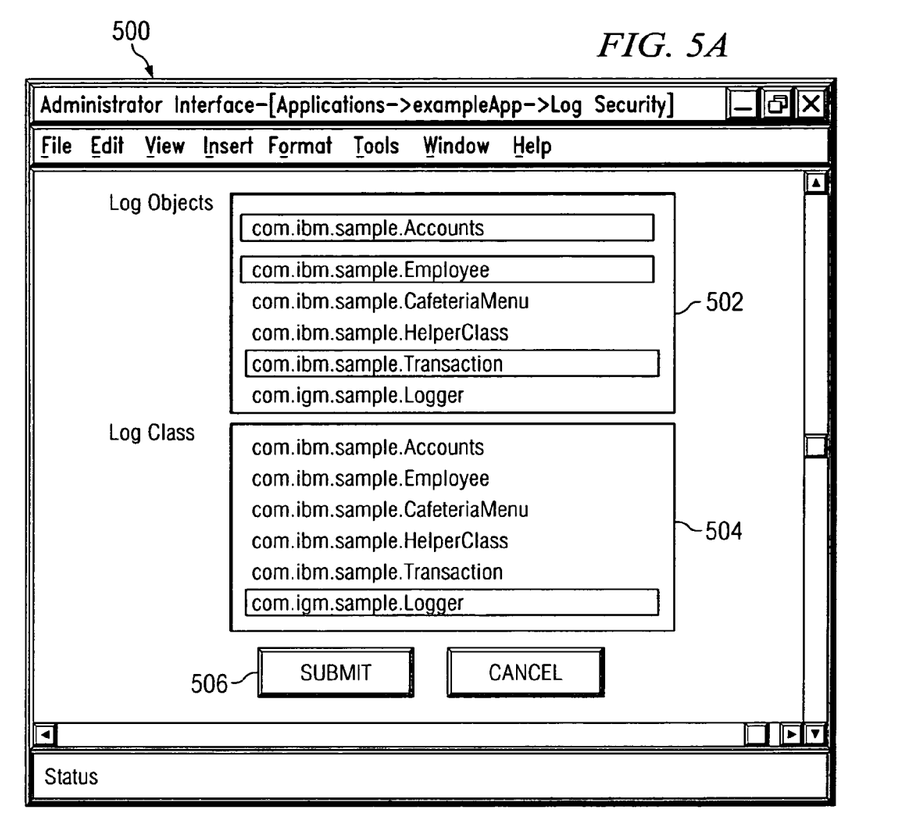
FIGS. 5A-5C depict example user interfaces for declarative identification of sensitive objects to be logged in accordance with an exemplary embodiment of the present invention.
Figure 5B:
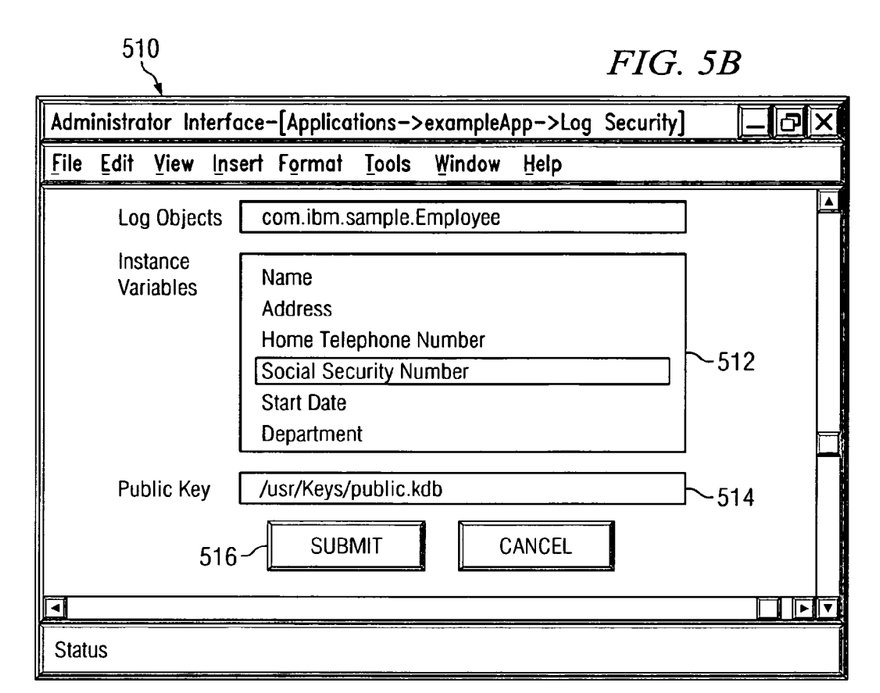
Figure 5C:
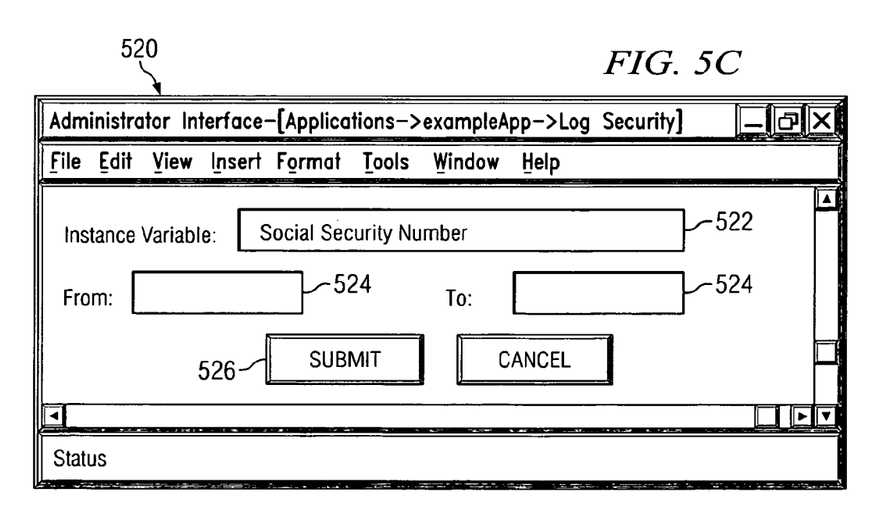

FIGS. 5A-5C depict example user interfaces for declarative identification of sensitive objects to be logged in accordance with an exemplary embodiment of the present invention. More particularly, with reference to FIG. 5A, interface window 500 represents the output of an application providing declarative identification of sensitive objects. An administrator is presented with interface window 500, which identifies and displays in interface components 502 and 504 all package/class files in the deployed application.

In interface component 502, the administrator may select the sensitive objects. In interface component 504, the administrator may select the class file for the logging application. When the selections are finished, the administrator may select the "Submit" button 506 to indicate that selection is complete.

Turning to FIG. 5B, interface window 510 represents the output of an application for declarative declaration of the instance variables to be encrypted. In this example, the administrator is presented with the instance variables for object "com.ibm.sample.Employee" in interface component 512. In interface component 512, the administrator may select zero or more instance variables to be encrypted. Additionally, in interface component 514, the administrator may identify a public key, for example, to use for encryption, although other encryption schemes may be used, such as a symmetric key encryption algorithm. When the selections are finished, the administrator may select the "Submit" button 516 to indicate that selection is complete.

Those of ordinary skill in the art will appreciate that the interface windows illustrated in FIGS. 5A and 5B may vary depending on the implementation. Other interface configurations may be used in addition to or in place of the interface windows depicted in FIGS. 5A and 5B. For example, the mechanism of the present invention may encrypt every parameter of the objects that identified as sensitive objects, in which case, interface window 510 may be unnecessary. Also, the public key may be entered in interface window 500 or in a separate dialog.

As an additional example, particular values in the instance variables of an object may be used as criteria in identifying specific instances to encrypt. For instance, a range of account numbers may be deemed to be sensitive, while objects having account numbers outside the specified range may be passed to the logging application without encryption. In this example, a user interface may present an interface component (not shown) in which the administrator may enter a range of values for a selected parameter.

FIG. 5C illustrates an example interface window 520 that represents the output of an application for declarative declaration of ranges of values of the instance variables to be encrypted. In this example, interface window 520 presents an instance variable, such as "Social Security Number" in the depicted example, in interface component 522. In interface components 524, the administrator may specify a range of values for the instance variable, such that only objects for which the specified instance variable has a value within the specified range will be encrypted.

Figure 6:
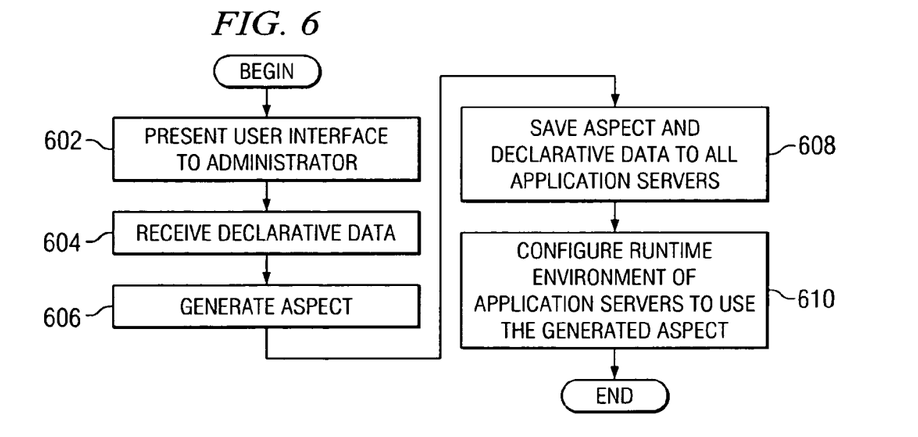
FIG. 6 is a flowchart illustrating operation of a mechanism for declaratively identifying sensitive objects to be logged in accordance with an exemplary embodiment of the present invention.

FIG. 6 is a flowchart illustrating operation of a mechanism for declaratively identifying sensitive objects to be logged in accordance with an exemplary embodiment of the present invention. Operation begins and the mechanism presents a user interface to an administrator (block 602). Then, the mechanism receives administrative data identifying sensitive objects, parameters to be encrypted, a logging class, and a public key to use for encryption (block 604).

Next, the mechanism generates an aspect (block 606) and saves the aspect and declarative data to all application servers (block 608). Thereafter, the mechanism configures the JVM of the application servers to use the generated aspect (block 610) and operation ends.

Figure 7:
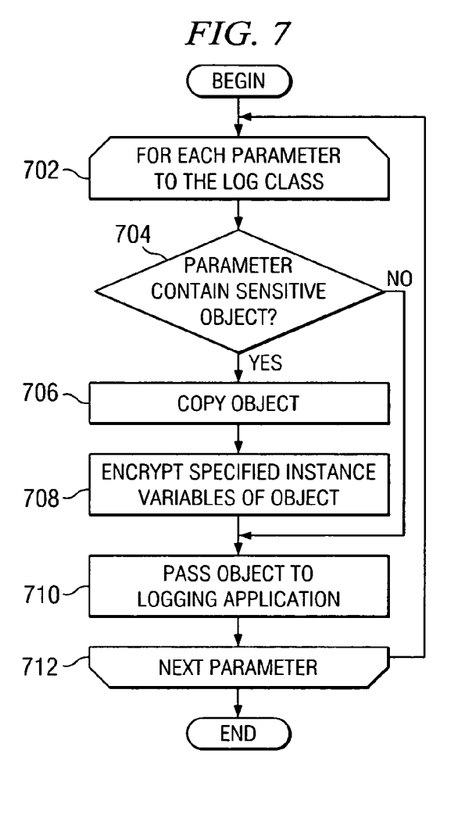
FIG. 7 is a flowchart illustrating operation of an encryption module with declarative identification of sensitive objects to be logged in accordance with an exemplary embodiment of the present invention.

FIG. 7 is a flowchart illustrating the operation of an encryption module with declarative identification of sensitive objects to be logged in accordance with an exemplary embodiment of the present invention. Operation begins when an application calls the log class to log data. For each parameter to the log class (block 702), a determination is made as to whether the parameter contains a sensitive object (block 704). If the parameter does not contain a sensitive object, then the encryption module passes the object to the logging application (block 710). Then, the encryption module considers the next parameter (block 712) and operation returns to block 702 to repeat the loop for the next parameter.

If the parameter contains a sensitive object in block 704, then the encryption module copies the object (block 706), encrypts specified instance variables of the object (block 708), and passes the object to the logging application (block 710). Then, the encryption module considers the next parameter (block 712) and operation returns to bock 702 to repeat the loop for the next parameter. When all of the parameters to be passed to the log class have been considered in the loop from block 702 to block 712, operation ends.

The encryption mechanism of the present invention is not limited to encrypting objects with the identification of the object being the only criterion. For example, particular values in the instance variables of the object may be used as criteria in identifying specific instances to encrypt. For instance, a range of account numbers may be deemed to be sensitive, while objects having account numbers outside the specified range may be passed to the logging application without encryption. Additionally, a range of account numbers may be encrypted with one key while a different range of account numbers may be encrypted with a different key.

Figure 8:
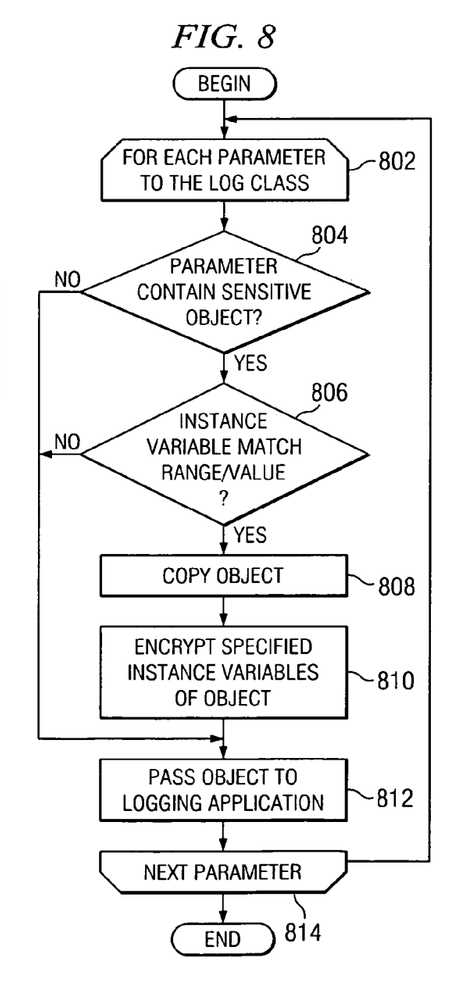
FIG. 8 is a flowchart illustrating operation of an encryption module with declarative identification of sensitive objects and parameter ranges to be encrypted at logging in accordance with an exemplary embodiment of the present invention.

FIG. 8 is a flowchart illustrating the operation of an encryption module with declarative identification of sensitive objects and parameter ranges to be encrypted at logging in accordance with an exemplary embodiment of the present invention. Operation begins when an application calls the logging class to log data. For each parameter to the log class (block 802), a determination is made as to whether the parameter contains a sensitive object (block 804). If the parameter does not contain a sensitive object, then the encryption module passes the object to the logging application (block 812). Then, the encryption module considers the next parameter (block 814) and operation returns to block 802 to repeat the loop for the next parameter.

If the parameter contains a sensitive object in block 804, then a determination is made as to whether a specified instance variable matches a specified value or range of values (block 806). If the instance variable does not match the specified value or range of values, then the encryption module passes the object to the logging application (block 812), and the encryption module considers the next parameter (block 814). Thereafter, operation returns to block 802 to repeat the loop for the next parameter.

If the instance variable does match the specified range/value in block 806, then the encryption module copies the object (block 808), encrypts the specified instance variables of the object to be encrypted (block 810), and passes the object to the logging application (block 812). Then, the encryption module considers the next parameter to be passed to the logging class (block 814), and operation returns to block 802 to repeat the loop for the parameter. When all of the parameters to be passed to the log class have been considered in the loop from block 802 to block 814, operation ends.

Thus, the present invention solves the disadvantages of the prior art by providing a mechanism to declaratively identify objects that are sensitive and requiring encryption on logging.

A user interface allows an administrator to identify the objects that are deemed to be sensitive log objects and the logging class that provides the logging functionality. The user interface may also allow the administrator to identify the public key to be used for encryption. The mechanism of the present invention dynamically generates logic for encryption of sensitive objects to be logged with declarative identification of sensitive objects.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system having a number of application servers, for logging sensitive objects, the method comprising:
  receiving declarative information identifying one or more sensitive objects and a log class;
  generating an aspect that is enabled to make an encrypted copy of sensitive objects that may then be passed on to the log class, wherein the generated aspect is saved to a storage device in each application server in the number of application servers;
  configuring a runtime environment of all application servers to use the generated aspect;
  responsive to a call to a log application, determining whether a given object being passed to the log application is one of the one or more sensitive objects; and
  if the given object is one of the one or more sensitive objects, encrypting the given object before passing the given object to the log application.

2. The method of claim 1, wherein encrypting the given object includes:
  copying the given object to form a copy of the given object; and
  for each instance variable of the given object to be encrypted, encrypting the instance variable in the copy of the given object.

3. The method of claim 1, wherein determining whether a given object being passed to the log application is one of the one or more sensitive objects includes determining whether a value of a specified instance variable of the given object is within a specified range.

4. The method of claim 1, wherein the declarative information includes encryption information and wherein encrypting the sensitive object includes encrypting at least one instance variable of the given object using the encryption information.

5. The method of claim 4, wherein the encryption information includes a public key.

6. The method of claim 1, wherein the declaration information is included in an extensible markup language file.

7. An apparatus, in a data processing system having a number of application servers, for logging sensitive objects, the apparatus comprising:
- a memory;
- a bus system;
- a processor that receives instructions stored in the memory through the bus system;
- a log application stored in memory; and
- an encryption module that receives declarative information identifying one or more sensitive objects and a log class, generates an aspect that is enabled to make an encrypted copy of sensitive objects that may then be passed on to the log class, wherein the generated aspect is saved to a storage device in each application server in the number of application servers, configures a runtime environment of all application servers to use the generated aspect, determines, responsive to a call to the log application, whether a given object being passed to the log application is one of the one or more sensitive objects, and encrypts the given object before passing the given object to the log application if the given object is one of the one or more sensitive objects.

8. The apparatus of claim 7, wherein the encryption module encrypts the given object by copying the given object to form a copy of the given object and, for each instance variable of the given object to be encrypted, encrypting the instance variable in the copy of the given object.

9. The apparatus of claim 7, wherein the encryption module determines whether a given object being passed to the log application is one of the one or more sensitive objects by determining whether a value of a specified instance variable of the given object is within a specified range.

10. The apparatus of claim 7, wherein the declaration information is included in an extensible markup language file.

11. A computer program product, in a computer readable storage medium having computer usable program code for logging sensitive objects in a data processing system having a number of application servers, the computer program product comprising:
- instructions for receiving declarative information identifying one or more sensitive objects and a log class;
- instructions for generating an aspect that is enabled to make an encrypted copy of sensitive objects that may then be passed on to the log class, wherein the generated aspect is saved to all application servers;
- instructions for configuring a runtime environment of all application servers to use the generated aspect;
- instructions, responsive to a call to a log application, for determining whether a given object being passed to the log application is one of the one or more sensitive objects; and
- instructions for encrypting the given object before passing the given object to the log application if the given object is one of the one or more sensitive objects.

12. The computer program product of claim 11, wherein the instructions for encrypting the given object include:
- instructions for copying the given object to form a copy of the given object; and
- instructions for encrypting, in the copy of the given object, each instance variable specified as an instance variable to be encrypted in the declaration information.

13. The computer program product of claim 11, wherein the instructions for determining whether a given object being passed to the log application is one of the one or more sensitive objects include instructions for determining whether a value of a specified instance variable of the given object is within a specified range.

14. The computer program product of claim 11, wherein the declaration information includes encryption information and wherein the instructions for encrypting the given object include instructions for encrypting at least one instance variable of the given object using the encryption information.

15. The computer program product of claim 11, wherein the declaration information is included in an extensible markup language file.

* * * * *